R. White,
Wrench.

No. 112,101. Patented Feb. 21, 1871.

Witnesses.
Jas. O. Hutchinson
C. L. Evert

Inventor.
Rollin White
per
Alexander T. Mason
attys

United States Patent Office.

ROLLIN WHITE, OF LOWELL, MASSACHUSETTS.

Letters Patent No. 112,101, dated February 21, 1871.

IMPROVEMENT IN WRENCHES.

The Schedule referred to in these Letters Patent and making part of the same.

*To all whom it may concern:*

Be it known that I, ROLLIN WHITE, of Lowell, in the county of Middlesex and in the State of Massachusetts, have invented certain new and useful Improvements in Wrenches; and do hereby declare that the following is a full, clear, and exact description thereof, reference being had to the accompanying drawing and to the letters of reference marked thereon making a part of this specification.

The nature of my invention consists in the construction and arrangement of a "wrench," as will be hereinafter more fully set forth.

In order to enable others skilled in the art to which my invention appertains to make and use the same, I will now proceed to describe its construction and operation, referring to the annexed drawing, in which—

Figure 1:
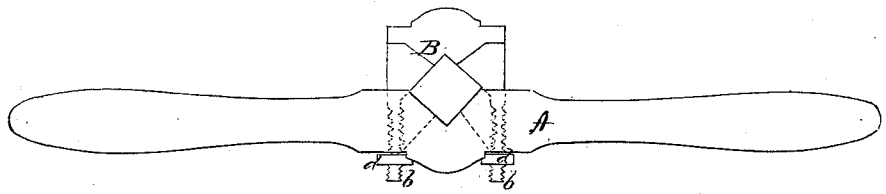
Figure 1 is a side view of my wrench.

A represents the handle, the center of which is flattened and cut out in one edge, as shown in fig. 1.

From the sides of this V-shaped cut, recesses or V-shaped chambers lead through the handle, and terminating in round holes through the other edge of the flattened central portion of the handle. The outer side of each of these recesses runs at right angles through the handle, and is semicircular or semi-tubular in form. These recesses are shown by dotted lines in fig. 1.

B represents the movable part or chuck of my wrench.

It consists of a central plate, *a*, cut with a V-shaped notch to correspond with the shape of the flattened portion of the handle, the jaws fitting into the recesses of the handle, thus forming, at whatever point it may be set, a square hole.

The sides of the plate *a* are extended, forming screw-rods *b b*, which pass entirely through the handle, and are provided with nuts, *d d*, by means of which the chuck may be set at any point desired, to suit any size nut, bolt, &c.

Figure 2:
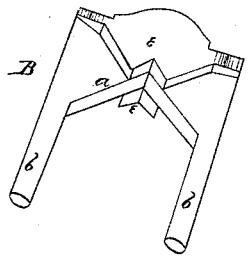
Figure 2 is an enlarged perspective view of the movable part or chuck of the wrench.

On each side of the plate *a* is attached a plate *e*, constructed as shown in fig. 2, so as to make the outer end of the chuck of the same thickness as the flattened portion of the handle.

It is, of course, evident that the entire chuck B may be made of one piece, if so desired; and in place of the screw-rods *b b* I may use two round rods as guides, with a cross-piece connecting them, and a screw through said cross-piece, to bear against the edge of the handle and thereby adjust the chuck.

Having thus fully described my invention,

What I claim as new, and desire to secure by Letters Patent, is—

1. The chuck B, constructed, as described, of a central plate, *a*, cut out and provided with the screw-rods *b b*, and side-plates *e e*, all substantially as and for the purposes herein set forth.

2. The combination of the handle A and adjustable or movable chuck B, constructed and arranged substantially as and for the purposes herein set forth.

In testimony that I claim the foregoing I have hereunto set my hand this 11th day of January, 1871.

ROLLIN WHITE.

Witnesses:
C. L. EVERT,
C. M. ALEXANDER.